(No Model.)

H. H. HILLMAN.
APPARATUS FOR SIFTING FLOUR.

No. 596,507. Patented Jan. 4, 1898.

Witnesses:
E. B. Bolton
Otto Munk

Inventor:
Henry Hammond Hillman
by Richardson
his Attorneys.

THE NORRIS PETERS CO., PHOTO-LITHO., WASHINGTON, D. C.

UNITED STATES PATENT OFFICE.

HENRY HAMMOND HILLMAN, OF DERBY, ENGLAND.

APPARATUS FOR SIFTING FLOUR.

SPECIFICATION forming part of Letters Patent No. 596,507, dated January 4, 1898.

Application filed March 15, 1897. Serial No. 627,693. (No model.) Patented in England February 19, 1897, No. 4,510.

*To all whom it may concern:*

Be it known that I, HENRY HAMMOND HILLMAN, a subject of the Queen of Great Britain and Ireland, and a resident of 75 Nottingham Road, Derby, in the county of Derby, England, have invented a certain new and useful Improved Apparatus or Device for Sifting Flour and the Like, (for which I have applied for a patent in Great Britain, the said application being numbered 4,510 and bearing date February 19, 1897,) of which the following is a specification.

The object of my invention is to provide an apparatus or device for sifting flour and the like that will facilitate the extraction of dirt or any hard substance, jute, or other foreign matter therefrom.

Figure 2:
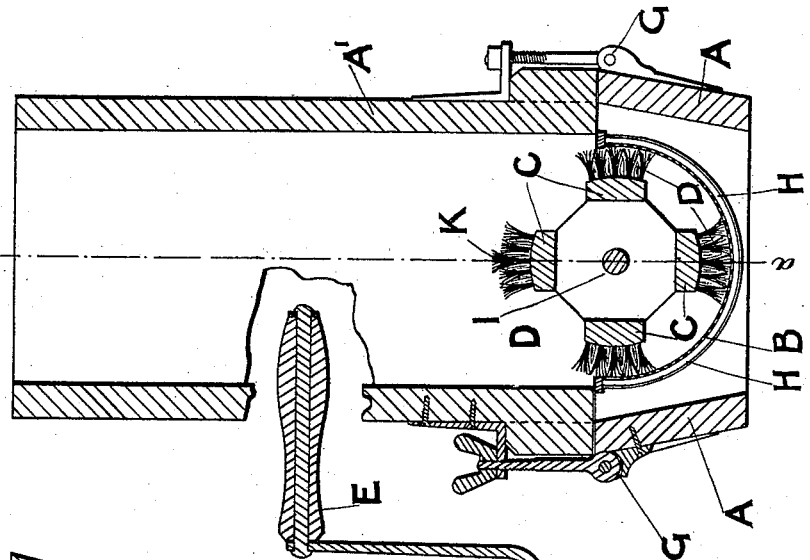
Figure 1:
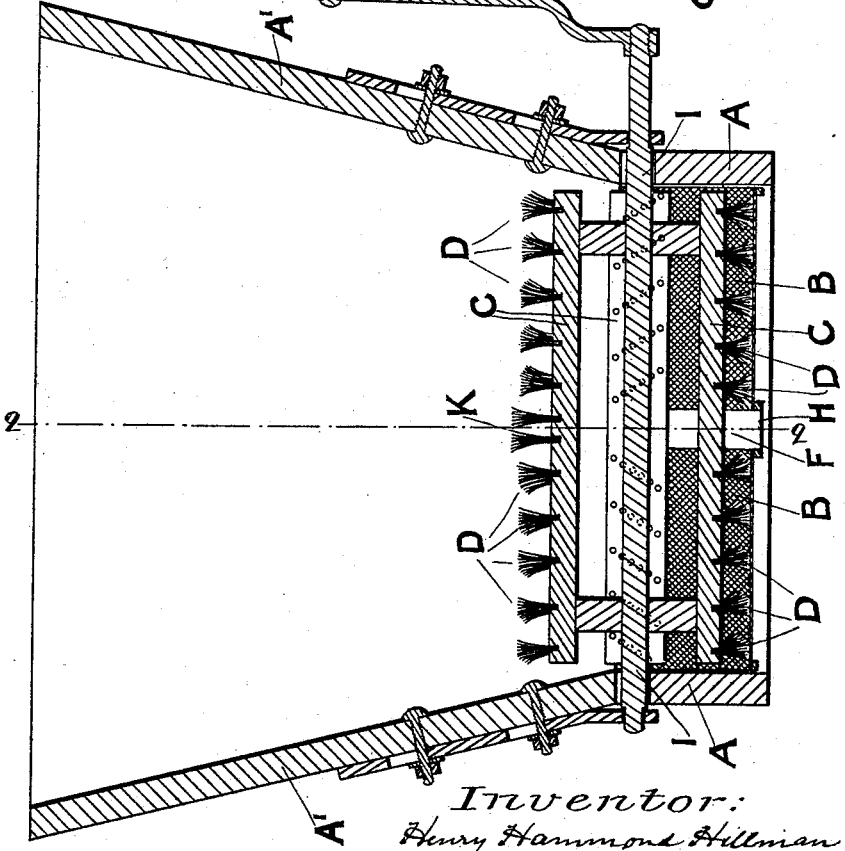

Referring to the drawings which form a part of this specification, Figure 1 is a vertical longitudinal section on line $a\ a$ of Fig. 2. Fig. 2 is a cross-section on line $b\ b$ of Fig. 1.

In carrying out my said invention I provide a box or hopper A A' to be placed in any suitable position either alone or under or in connection with a delivery-spout, through which the flour or the like is delivered to the sifter, the delivery-spout not being shown upon the drawings. The lower part A of this box or hopper contains a sieve B. Inside this sieve an open drum is arranged, consisting of any desired number of sides C, containing sets of brushes D, which are set diagonally, so that as they are revolved by means of the handle E, or by power, if desired, they come in contact with the sieve, brushing the smaller particles through it and carrying the coarser and foreign substances toward the open space F in the center, the lighter substances of a clinging or entangling nature, such as jute or the like, becoming attached to the brushes.

The upper part A' of the box or hopper is secured to the lower by means of adjustable and detachable hinges G.

I provide a recessed portion H in the center of the sieve to receive the coarser portions and refuse. Any suitable adjustable bearings may be employed for the ends of the shaft I, carrying the revolving open drum, and any suitable means may be employed for fixing the said drum on its shaft.

As a great deal of the finer particles will doubtless find their way to the central recessed portion H in the sieve, I may provide any suitable agitating device, such as fixing one set of bristles or the like K upon one section only of the drum, so that once in every revolution of the drum the particles contained in the recessed portion will be cleared of the finer matter. The recessed portion H of the sieve may either be perforated or of a plain trough-like form, as shown.

Having now described my invention, what I claim as new, and desire to secure by Letters Patent, is—

In an apparatus or device for sifting flour or the like the combination of a box or hopper in sections A A' with adjustable hinges G and containing a sieve B, with recessed annular central portion H, a revolving drum carrying brushes D adapted to carry the coarser or foreign matter into the recessed portion H of the sieve aforesaid, the said drum also carrying an intermittent agitating device such as the brush K, said recessed portion being below the body of the sieve and the said brush K being longer than the brushes D and acting to brush the coarser particles from said recessed portion, substantially as set forth.

In witness whereof I have hereunto set my hand in presence of two witnesses.

HENRY HAMMOND HILLMAN.

Witnesses:
   W. SWINDELL,
   O. W. FORMAN.